(12) United States Patent
Asbeck et al.

(10) Patent No.: US 7,104,909 B2
(45) Date of Patent: Sep. 12, 2006

(54) BELT TENSIONING DEVICE

(75) Inventors: Jochen Asbeck, Attendorn (DE); Thomas Berndt, Hof (DE); Joachim Jud, Daaden (DE); Rudolf Bonse, Attendorn (DE)

(73) Assignee: Muhr und Bender KG, (DE)

( * ) Notice: Subject to any disclaimer, the term of this patent is extended or adjusted under 35 U.S.C. 154(b) by 0 days.

(21) Appl. No.: 10/950,847

(22) Filed: Sep. 27, 2004

(65) Prior Publication Data

US 2005/0043131 A1 Feb. 24, 2005

Related U.S. Application Data

(63) Continuation of application No. 10/189,661, filed on Jul. 3, 2002, now abandoned.

(30) Foreign Application Priority Data

Jul. 5, 2001 (DE) .................. 101 31 916

(51) Int. Cl.
*F16H 7/08* (2006.01)
*F16H 7/12* (2006.01)
(52) U.S. Cl. .................. 474/135; 474/133; 474/112
(58) Field of Classification Search ............ 474/133, 474/135, 112, 101, 136–139, 113–117
See application file for complete search history.

(56) References Cited

U.S. PATENT DOCUMENTS

| | | | |
|---|---|---|---|
| 4,472,162 A | 9/1984 | Hitchcock | |
| 4,583,962 A * | 4/1986 | Bytzek et al. | ............ 474/133 |
| 4,698,049 A | 10/1987 | Bytzek et al. | |
| 4,813,915 A * | 3/1989 | Kotzab | .............. 474/133 |
| 5,083,983 A * | 1/1992 | Hirai et al. | .............. 474/135 |
| 5,195,932 A * | 3/1993 | Hirai et al. | .............. 474/135 |
| 5,518,459 A | 5/1996 | Sakai et al. | |
| 5,620,385 A * | 4/1997 | Cascionale et al. | ......... 474/112 |
| 6,264,578 B1 * | 7/2001 | Ayukawa | .................... 474/135 |
| 6,375,588 B1 * | 4/2002 | Frankowski et al. | ........ 474/112 |
| 6,575,860 B1 * | 6/2003 | Dutil | .......................... 474/135 |

FOREIGN PATENT DOCUMENTS

| | | | |
|---|---|---|---|
| DE | 3728158 A1 * | 3/1989 | |
| DE | 41 34 354 A1 | 4/1993 | |
| DE | 43 00 178 C1 | 4/1994 | |
| DE | 43 25 424 C1 | 2/1995 | |
| DE | 43 45 150 A1 | 5/1995 | |
| DE | 4124636 C2 * | 4/1997 | |
| DE | 4336467 C2 * | 4/1997 | |
| DE | 195 40 706 A1 | 5/1997 | |
| EP | 0294919 B1 * | 7/1992 | |
| JP | 2001-165252 A * | 6/2001 | |
| JP | 2001-165253 A * | 6/2001 | |

* cited by examiner

*Primary Examiner*—Marcus Charles

(57) ABSTRACT

A tensioning device for attraction mechanism including a receiving and mounting housing, a roller carrier pivotably connected to the mounting housing, a bearing which radially supports the roller carrier relative to the mounting housing, a spring between the roller carrier and the mounting housing for applying a tensioning force, and a damping device. The damping device includes a damping bush which, by friction, dampens any movement between the roller carrier and the mounting housing in such a way that damping is greater in the direction of an increasing tension force than in the direction of decreasing tension force. A flat band spring applies the friction force to the damping bush. The flat band spring is secured, at a first end, to the receiving and mounting housing in a rotationally fast way, and at a second end to the damping bush in a rotationally fast way.

23 Claims, 3 Drawing Sheets

BELT TENSIONING DEVICE

CROSS-REFERENCE TO RELATED APPLICATION

This is a Continuation of U.S. patent application Ser. No. 10/189,661 filed on Jul. 3, 2002 now abandoned.

TECHNICAL FIELD

The present invention relates to a tensioning device for a traction means, such as a belt tensioning device.

BACKGROUND OF THE INVENTION

The invention relates to a tensioning device for traction means, such as a belt tensioning device, having a receiving and mounting housing, a roller carrier pivotably connected to the receiving and mounting housing, a bearing which radially and axially supports the roller carrier relative to the receiving and mounting housing, a spring for applying the tensioning force, and a damping device. The spring is arranged between the roller carrier and the receiving and mounting housing and the damping device comprises a damping bush. By friction, the damping device dampens any movements between the roller carrier and the receiving and mounting housing in such a way that the damping effect is greater in the direction of an increasing tensioning force than in the direction of a decreasing tensioning force.

In motor vehicles, the vehicle engine drives various auxiliary units such as a generator, a water pump for vehicle engines with fluid cooling, a pump for servo-power for motor vehicles with steering assistance and a compressor for an air-conditioning system. Such auxiliary units are driven by a main belt pulley positioned on the crankshaft of the vehicle engine and by an infinite driving belt which, on the one hand, moves via the main belt pulley and, on the other hand, moves via auxiliary belt pulleys arranged on the driveshafts of the auxiliary units. The functional efficiency of the auxiliary units and the service life of the driving belt greatly depend on the setting and maintaining of a certain belt tension of the driving belt. To improve the functional efficiency of the auxiliary units and to prolong the service life of the driving belt, it is general practice to use a spring-loaded belt tensioning device which, as a rule, comprises a damping device, so that any slip and vibrations can be compensated for or reduced.

It is mentioned above that the invention relates to a tensioning device for traction means. Above, details are given of a special tensioning device for traction means, i.e. a belt tensioning device. Below, the tensioning device for traction means, which is dealt with by the invention, will always be referred to and described as a belt tensioning device. This does not alter the fact that the described tensioning device for traction means can also be used for other applications, i.e. not only as a belt tensioning device.

The initially described basic design of belt tensioning devices, i.e. comprising a receiving and mounting housing, having a roller carrier which is pivotably connected to the receiving and mounting housing, bearings which radially and axially support the roller carrier relative to the receiving and mounting housing, a spring which applies the tensioning force and is arranged between the roller carrier and the receiving and tensioning housing, as well as a damping device, is generally known and to that extent, reference is made to the German publication documents 37 28 158; 41 24 636; 41 34 354; 43 36 467; 43 45 150; 44 27 683; 195 40 706 and 196 03 558, to the German patent specifications 43 00 178 and 43 25 424, to the European publication documents 0 294 919 and 0 858 563 as well as to the U.S. Pat. Nos. 4,698,049 and 4,472,162. Substantial differences, in particular, refer to the damping device.

In the case of the belt tensioning devices known from the German publication documents 195 40 706 and 196 03 558 and from the European publication document 0 858 563, the function of the bearing and that of the damping device are combined in one assembly. The assembly is a cone-type friction bearing which is applied by a spring force and which, on the one hand, radially and axially supports the roller carrier relative to the receiving and mounting housing and, on the other hand, by way of friction, dampens the movements between the roller carrier and the receiving and mounting housing. The disadvantage of the prior art belt tensioning devices is that, on the one hand, due to the unavoidable wear of the cone-type friction bearing, the roller carrier moves axially relative to the receiving and mounting housing and, on the other hand, the damping effect in the direction of load application, i.e. in the direction of an increasing tensioning force, is identical to the damping effect in the direction of load relief, i.e. in the direction of a decreasing tensioning force.

In the belt tensioning device known from the European publication document 0 294 919, it has been possible to avoid the two above-mentioned disadvantages which are inherent in the belt tensioning devices known from the German publication documents 195 40 706 and 196 03 558 and from the European publication document 0 294 919. As the belt tensioning device known from the European publication document 0 294 919 does not comprise a cone-type friction bearing, the disadvantage relating to such a cone-type friction bearing, i.e. that the roller carrier moves axially relative to the receiving and mounting housing, has been avoided. In the belt tensioning device known from the European publication document 0 294 919, the damping device is designed in such a way that the damping effect in the direction of the increasing tensioning force is greater than in the direction of the decreasing tensioning force.

As far as details are concerned, the damping device used in the belt tensioning device according to the European publication document 0 294 919 comprises a damping bush and a band which is positioned around the damping bush, whose first end is rigidly connected to the receiving and mounting housing and whose other end is subjected to a spring force. The spring force for tensioning the band is applied either by an additional helical spring on the receiving and mounting housing or by the spring primarily serving for applying the tensioning force. In the embodiment shown, it is a coil spring in the form of a leg spring. The first variant is disadvantageous in that there is a need for considerable additional means, in particular, the additionally required helical spring. The second variant is disadvantageous in that the design of the spring which serves to apply the tensioning force also determines the damping characteristics of the belt tensioning device. The degree of freedom desirable for the damping characteristics is thus missing.

SUMMARY OF THE INVENTION

It is, therefore, an object of the present invention to simplify the design and the production technology of a belt tensioning device in such a way that, above all, it can be produced more cost-effectively than prior art belt tensioning devices, without attendant disadvantages.

The inventive belt tensioning device achieves the above-mentioned objective, and is initially and primarily characterised by a flat band spring for applying the friction force to the damping bush. The flat band spring, at its first end, is secured in a rotationally fast way to the receiving and mounting housing or at the roller carrier and, at its second end, is secured to the damping bush.

The present invention provides a tensioning device for a traction mechanism including a receiving and mounting housing, a roller carrier pivotably connected to the mounting housing, a bearing which radially supports the roller carrier relative to the mounting housing, a spring between the roller carrier and the mounting housing for applying a tensioning force, and a damping device. The damping device includes a damping bush which, by friction, dampens any movement between the roller carrier and the mounting housing in such a way that damping is greater in the direction of an increasing tension force than in the direction of decreasing tension force. A flat band spring applies the friction force to the damping bush. The flat band spring is secured, at a first end, to the receiving and mounting housing in a rotationally fast way, and at a second end to the damping bush in a rotationally fast way.

In belt tensioning devices of the type generally referred to herein, the damping effect which compensates for or reduces slip and vibrations is achieved by friction which occurs in the case of movements between the roller carrier and the receiving and mounting housing. On the one hand, this requires concentrically extending friction faces which correspond to one another, such friction faces being the inner or outer cylindrical face of the damping bush, and a corresponding friction face at the roller carrier or at the receiving and mounting housing. On the other hand, there is required, in the form of a normal force, a friction force between the friction faces corresponding to one another.

In the belt tensioning device known from the European publication document 0 294 919, the friction force serving for friction purposes is generated by two elements, i.e. by the band positioned around the damping bush and by a spring by means of which the band positioned around the damping bush is tensioned. In contrast, in the belt tensioning device in accordance with the invention, the friction force serving for friction purposes is generated by one single element, i.e. by the flat band spring which either partially or wholly embraces the damping bush and which, is secured to the receiving and mounting housing or to the roller carrier and, also, to the damping bush. The flat band spring acts on the damping bush like a clamp band, such as on an associated hose end. That the flat band spring is secured to the receiving and mounting housing or to the roller carrier on the one hand, and to the damping bush, on the other hand, however, is important.

Because the belt tensioning device in accordance with the invention comprises a flat band spring which is secured to the receiving and mounting housing or to the roller carrier, and also to the damping bush, the damping bush is substantially rotationally fixed so that the movements between the roller carrier and the receiving and mounting housing generate friction between the friction faces associated with one another and thus cause a damping effect.

With the inventive belt tensioning device, the damping bush is substantially rotationally fixed, i.e. it is substantially secured against rotating. In this regard, "substantially" indicates that any movements between the roller carrier and the receiving and mounting housing lead to minimum rotational movements of the damping bush. Such minimum rotational movements of the damping bush are due to the fact that the friction force between the mutually corresponding friction faces leads to a torque acting on the damping bush. As the damping bush is not actually fixed rigidly, but is fixed resiliently by the flat band spring, the torque acting in the damping bush also results in a rotational movement of the damping bush. The minimal rotational movement of the damping bush leads to a minimal change in the diameter of the flat band spring which, either partially or fully, embraces the damping bush. As a result, there occurs a change in the friction force originating from the flat band spring, and thus also in the damping effect.

The above explanations now provide the wanted facility of ensuring that the damping effect in the direction of load application, i.e. in the direction of an increasing tensioning force is greater than in the direction of load relief, i.e. in the direction of a decreasing tensioning force, which, in fact, is not desired.

As far as details are concerned, there exists a plurality of possibilities of designing and further improving the belt tensioning device in accordance with the invention. For this purpose, reference is made to the description of a preferred embodiment in connection with the drawings and to the appended claims.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
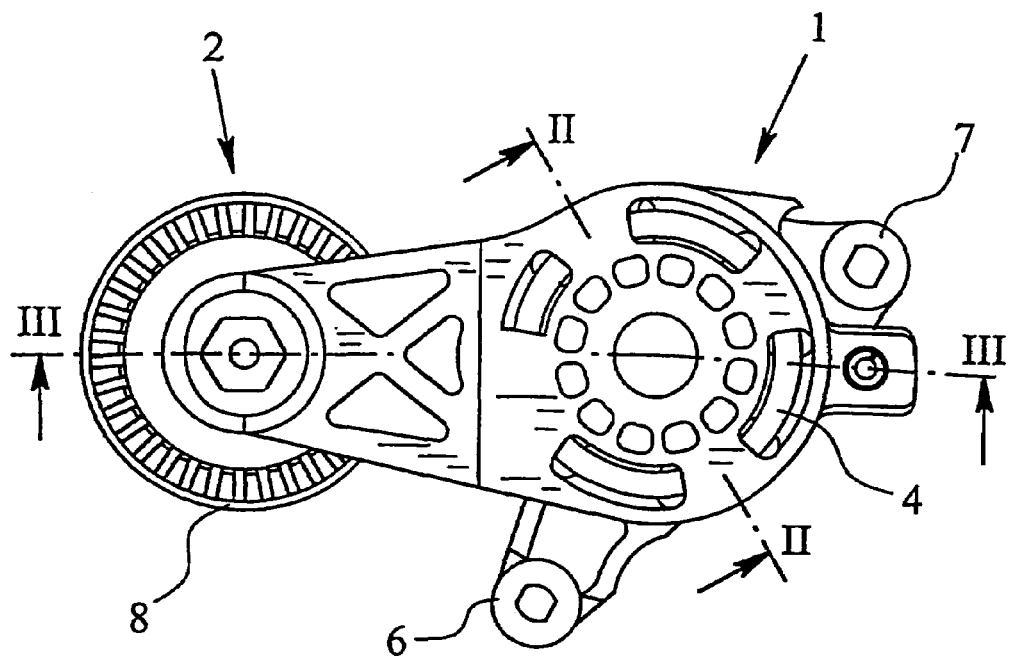
FIG. 1 is a plan view of a preferred embodiment of an inventive belt tensioning device.

While the present invention is described with respect to a belt tensioning device, the present invention may be adapted and utilized for tensioning other traction mechanisms. Thus, although the following components are described for a constructed embodiment, these specific components are included as examples and are not meant to be limiting.

The Figures show a tensioning device for traction means, namely a belt tensioning device. The belt tensioning device comprises a receiving and mounting housing 1, a roller carrier 2 which is pivotably connected to the receiving and mounting housing 1, a bearing 3 which radially and axially supports the roller carrier 2 relative to the receiving and mounting housing 1, a spring which applies the tensioning force and is arranged between the roller carrier 2 and the receiving and mounting housing 1, which spring, in the embodiment shown, is a helical spring 4 in the form of a leg spring, as well as a damping device 5.

As shown in FIG. 1, the receiving and mounting housing 1 shown in the embodiment is provided with two fixing lugs 6, 7. By way of the mounting lugs 6, 7 and mounting screws (not shown), it is possible to fix the receiving and mounting housing 1, and thus the belt tensioning device as a whole, for example on the vehicle engine (not shown). A tensioning pulley 8 is rotatably supported at the roller carrier 2, preferably via a rolling contact bearing which does not have to be described in detail. When mounted in the inventive belt tensioning device, the tensioning pulley 8 acts on a driving belt (not shown). By way of the tensioning pulley 8, the driving belt (not illustrated) is provided with a certain belt tension which is of particular significance for the functional efficiency of auxiliary units driven by the driving belt and for the service life of the driving belt. The damping device 5 also provided in the inventive belt tensioning device, above all, serves to compensate for, or reduce, slip and vibrations.

Figure 2:
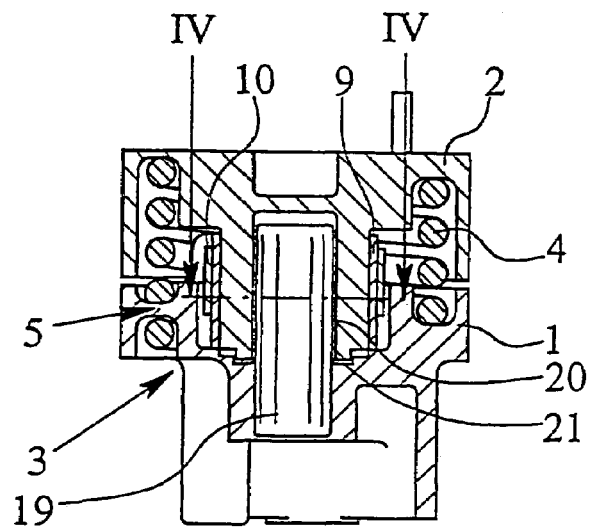
FIG. 2 is a section through the belt tensioning device according to FIG. 1 along line II—II.
Figure 3:
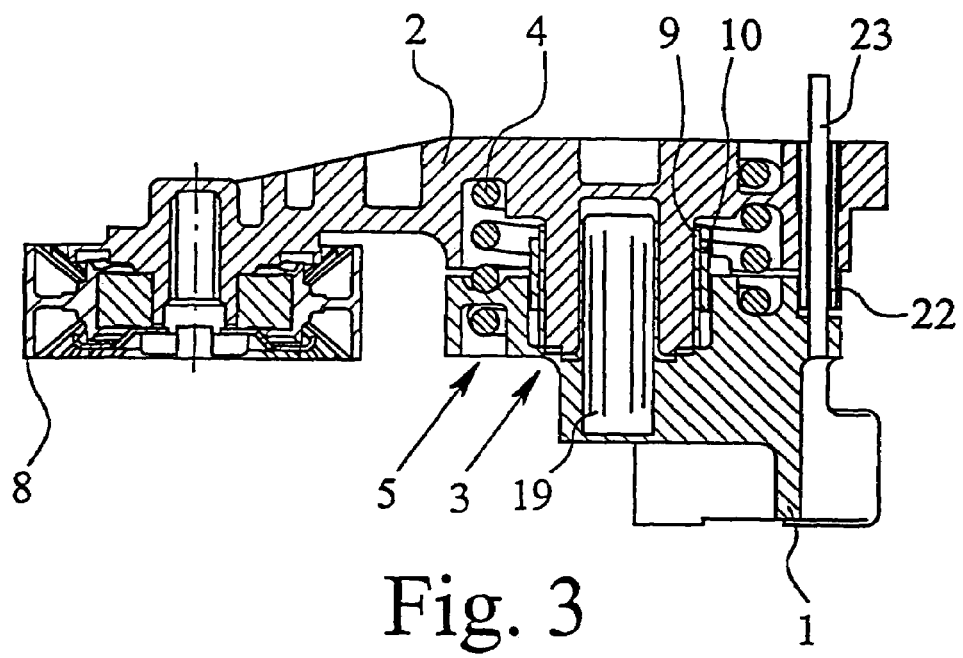
FIG. 3 is a section through the belt tensioning device according to FIG. 1 along line III—III.
Figure 4:
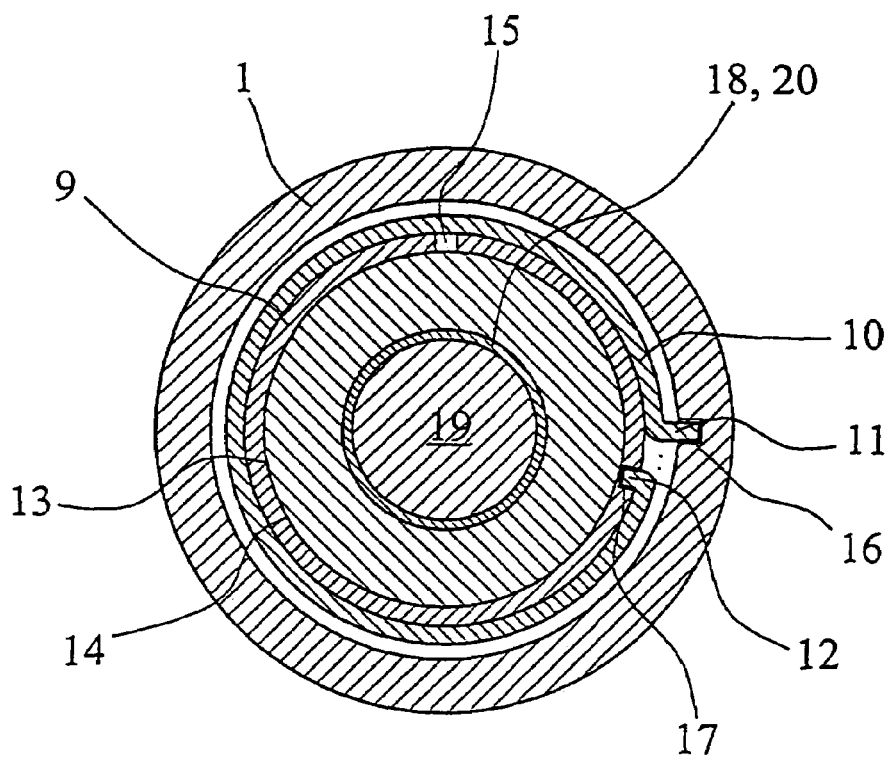
FIG. 4 is a diagrammatic illustration regarding further explanations in respect of the inventive belt tensioning device, generally according to a section through the belt tensioning device according to FIG. 2 along line IV—IV.

As shown in FIGS. 2, 3 and 4, the damping device 5 of the inventive belt tensioning device comprises a damping bush 9 and a flat band spring 10. By way of its first end 11, the flat band spring 10 is connected to the receiving and mounting housing 1 in a rotationally fast way, and by way of its second end 12, it is secured to the damping bush 9 in a rotationally fast way.

In belt tensioning devices of the type generally referred to here, i.e. also in belt tensioning devices in accordance with the invention, the damping effect which compensates for, or reduces, slip and vibrations, is achieved by friction occurring as a result of movements between the roller carrier 2 and the receiving and mounting housing 1. On the one hand, it is necessary to provide concentrically extending friction faces which correspond to one another. In the embodiment shown, the friction faces are the inner cylindrical face 13 of the damping bush 9, and a corresponding friction face 14 at the roller carrier 2. On the other hand, it is necessary to provide a normal force in the form of a friction force between a pair of friction faces, i.e. between the inner cylindrical face 13 of the damping bush 9 and the corresponding friction face 14 at the roller carrier 2.

For the inventive belt tensioning device it is important that the friction force required for friction purposes is generated by one single component, i.e. by the flat band spring 10 which embraces the damping bush 9 either partially or wholly and which is fixed to the receiving and mounting housing 1, and to the damping bush 9. The flat band spring 10 acts on the damping bush 9 in the same way in which, for example, a band clamp acts on an associated hose end, and it is particularly important that the flat band spring 10 is secured to the receiving and mounting housing 1 on the one hand, and to the damping bush 9, on the other hand. Because the belt tensioning device in accordance with the invention is provided with a flat band spring 10 which is secured to the receiving and mounting housing 1 and to the damping bush 9, the damping bush 9 is substantially rotationally fixed, so that movements between the roller carrier 2 and the receiving and mounting housing 1 generate friction, and thus a damping effect, between the associated friction faces, i.e. between the inner cylindrical face 13 of the damping bush 9 and the corresponding friction face 14 at the roller carrier 2.

In the inventive belt tensioning device, the damping bush 9 is substantially rotationally fixed, i.e. it is substantially prevented from rotating. In actual fact, however, movements between the roller carrier 2 and the receiving and mounting housing 1 lead to minimum rotational movements of the damping bush 9. The minimum rotational movements of the damping bush 9 are due to the fact that the friction force between the friction faces corresponding to one another. That is, between the inner cylindrical face 13 of the damping bush 9 and the corresponding friction face 14 of the roller carrier, a torque acts upon the damping bush 9. The damping bush 9 is not actually secured rigidly, but it is secured resiliently by the flat band spring 10. In consequence, the torque acting on the damping bush 9 also causes a rotational movement of the damping bush 9. The effect of this minimal rotational movement of the damping bush 9 is that the diameter of the flat band spring 10 which either partially or wholly embraces the damping bush 9, undergoes a minimum change, which means that the friction force resulting from the flat band spring 10 and thus the damping force also changes. This provides the desired facility of ensuring that the damping effect in the direction of load application, i.e. in the direction of an increasing tensioning force, is greater than in the direction of load relief, i.e. in the direction of a decreasing tensioning force. For this purpose, the flat band spring 10 is mounted in such a way that when the roller carrier 2 moves in the direction of load application, i.e. in the direction of an increasing tensioning force, the diameter of the flat band spring 10 embracing the damping bush 9 decreases by a minimum amount.

It follows from the above that it must be possible for the damping bush 9 to change its diameter as a result of the friction force acting thereon. This could be achieved by producing the damping bush from a sufficiently resilient material. However, in a preferred embodiment, this is achieved in that the damping bush 9 is slotted, i.e. in that it comprises a slot 15 suitable for diameter reduction.

It forms part of the invention that the flat band spring associated with the damping device 5, by way of its first end 11, is connected to the receiving and mounting housing 1 (or to the roller carrier 2) in a rotationally fast way and that, by way of its second end 12, it is connected to the damping bush 9 in a rotationally fast way. This can be achieved in different ways. The flat band spring lop by way of its first end 11, is preferably form-fittingly fixed to the receiving and mounting housing 1. For example, as shown in the embodiment, by way of its first end 11, it is held in a fixing slot 16 provided at the receiving and mounting housing 1. The foregoing with reference to fixing the flat band spring 10 by way of its first end 11, also applies to fixing the flat band spring 10 by way of its second end 12. Thus, the flat band spring 10, by way of its second end 12, can be form-fittingly secured to the damping bush 9. In particular, the flat band spring 10, by means of its second end 12, can be held in a fixing slot 17 provided at the damping bush 9.

As already mentioned in connection with the inventive belt tensioning device, there is provided a bearing 3 which radially and axially holds the roller carrier 2 relative to the receiving and mounting housing 1. In the embodiment shown in the figures, the bearing 3 radially and axially supporting the roller carrier 2 relative to the receiving and mounting housing 1 includes a bearing bush 18 connected to the roller carrier 2 and a bearing pin 19 connected to the receiving and mounting housing 1. The bearing bush 18, in turn, includes of a bearing sleeve 20 serving to provide radial support and a bearing collar 21 serving to provide axial support. Other bearing arrangements are also contemplated as would be understood by those of skill in the art.

Figure 5:
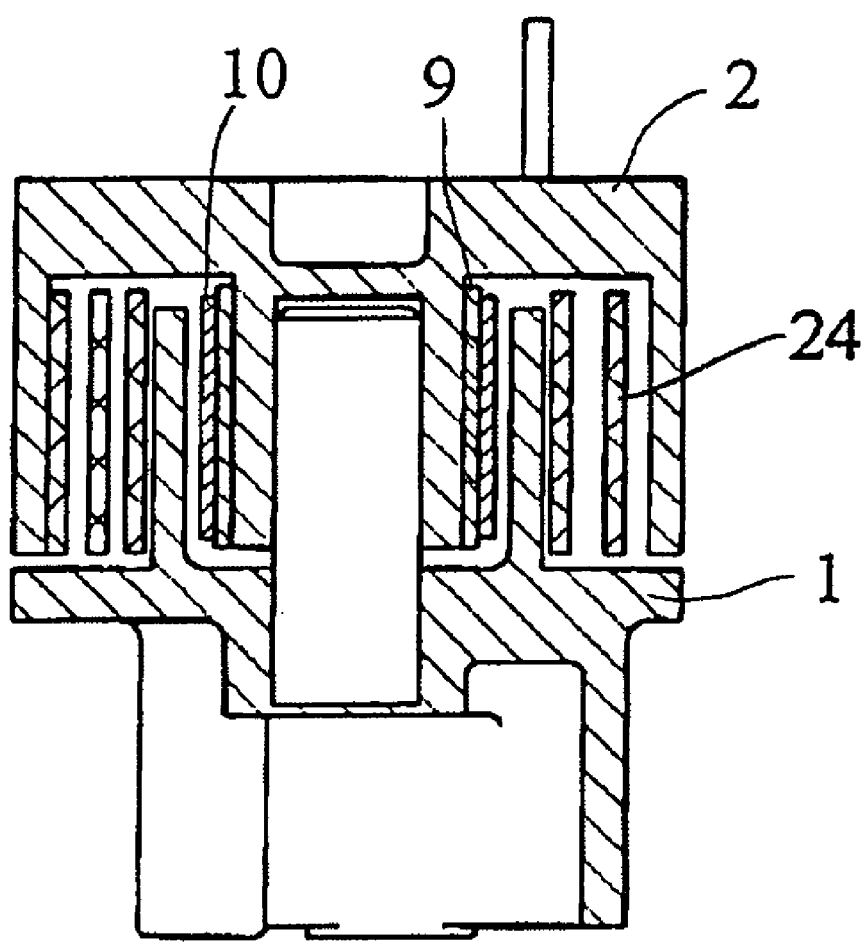
FIG. 5 is a sectional view similar to FIG. 2 showing the first spring as a flat spiral spring.

In the belt tensioning device in accordance with the invention, the spring serving to provide tensioning force between the roller carrier 2 and the receiving and mounting housing 1 could be provided in the form of a flat spiral spring 24 as shown in FIG. 5. However, in the embodiment shown in FIGS. 2 and 3, the spring required for applying the tensioning force between the roller carrier 2 and the receiving and mounting housing 1 is provided in the form of a helical spring 4 in the form of a leg spring. In the embodiment shown, the helical spring 4, which is subjected to tensile loads, also connects the roller carrier 2 to the receiving and mounting housing 1 and axially fixes the roller carrier 2 via the bearing 3 relative to the receiving and mounting housing 1. The friction occurring in this design between the bearing collar 21 of the bearing bush 18 and the receiving and mounting housing 1, if a movement takes place between the roller carrier 2 and the receiving and mounting housing 1, is negligibly small relative to the friction which is deliberately generated in the region of the damping device 5.

As far as the illustrated and described embodiment is concerned, the damping bush 9 is secured via the flat band spring 10 to the receiving and mounting housing 1 in a rotationally fast way. However, it is also possible to secure the damping bush 9 via the flat band spring 10 to the roller carrier 2 in a rotationally fast way.

Finally, it should be pointed out that with the illustrated embodiment of an inventive belt tensioning device, the tensioning bush 22 is provided with a tensioning pin 23. The tensioning bush 22 serves as a stop for delimiting the possible movement between the roller carrier 2 and the receiving and mounting housing 1. The tensioning pin 23 which can be inserted through the tensioning bush 22 can be used for mounting the inventive belt tensioning device in the mounting position.

From the foregoing, it can be seen that there has been brought to the art a new and improved tensioning device. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A tensioning device for a traction mechanism comprising:
   a receiving and mounting housing;
   a roller carrier pivotably connected to the receiving and mounting housing;
   a bearing which radially and axially supports the roller carrier relative to the receiving and mounting housing;
   a first spring arranged between the roller carrier and the receiving and mounting housing for applying a tensioning force;
   a cylindrical damping bush surrounding an inner cylindrical surface of the roller carrier, and having a slot for diameter reduction, the bush damping any movements between the roller carrier and the receiving and mounting housing In such a way that the damping effect is greater in the direction of an increasing tensioning force than in the direction of a decreasing tensioning force, and
   a flat band spring surrounding and applying a normal force to the damping bush, the flat band spring at a first end being secured to the receiving and mounting housing or to the roller carrier in a rotationally fixed and form-fitting way and, at its second end being secured to the damping bush in a rotationally fixed and bi-directionally form-fitting way.

2. A tensioning device according to claim 1 wherein the damping bush comprises a resilient material.

3. A tensioning device according to claim 1 wherein at its first end, the flat band spring is held in a mounting slot provided at the receiving and mounting housing.

4. A tensioning device according to claim 1 wherein at its second end, the flat band spring is held in a fixing slot provided in the damping bush.

5. A tensioning device according to claim 1 wherein the bearing comprises a bearing bush connected to the roller carrier and a bearing pin connected to the receiving and mounting housing.

6. A tensioning device according to claim 5 wherein the bearing bush comprises a bearing sleeve providing radial support and a bearing collar providing axial support.

7. A tensioning device according to claim 6 wherein the first spring provided between the roller carrier and the receiving and mounting housing is a flat spiral spring.

8. A tensioning device according to claim 6 wherein the first spring provided between the roller carrier and the receiving and mounting housing is a helical spring.

9. A tensioning device according to claim 8 wherein the helical spring, when subjected to tensile loads, also connects the roller carrier to the receiving and mounting housing and axially fixes the roller carrier, via the bearing, relative to the receiving and mounting housing.

10. A tensioning device according to claim 5 wherein the first spring provided between the roller carrier and the receiving and mounting housing is a flat spiral spring.

11. A tensioning device according to claim 5 wherein the first spring provided between the roller carrier and the receiving and mounting housing is a helical spring.

12. A tensioning device according to claim 11 wherein the helical spring, when subjected to tensile loads, also connects the roller carrier to the receiving and mounting housing and axially fixes the roller carrier, via the bearing, relative to the receiving and mounting housing.

13. A tensioning device according to claim 1 wherein the first spring provided between the roller carrier and the receiving and mounting housing is a flat spiral spring.

14. A tensioning device according to claim 1 wherein the first spring provided between the roller carder and the receiving and mounting housing is a helical spring.

15. A tensioning device according to claim 14 wherein the helical spring, when subjected to tensile loads, also connects the roller carrier to the receiving and mounting housing and axially fixes the roller carrier, via the bearing, relative to the receiving and mounting housing.

16. A tensioning device for a traction mechanism comprising:
   a receiving and mounting housing;
   a roller carrier pivotably connected to the receiving and mounting housing;
   a bearing which radially and axially supports the roller carrier relative to the receiving and mounting housing;
   a first spring arranged between the roller carrier and the receiving and mounting housing for applying a tensioning force;
   a cylindrical damping bush surrounding an inner cylindrical surface of the roller carrier, and having a slot for diameter reduction, the bush damping any movements between the roller carrier and the receiving and mounting housing in such a way that the damping effect is greater in the direction of art increasing tensioning force than in the direction of a decreasing tensioning force, and
   a flat band spring surrounding and applying a normal force to the damping bush, the flat band spring at a first end being secured to the receiving and mounting housing or to the roller carrier in a rotationally fixed and form-fitting way and, at its second end being secured to the damping bush in a rotationally fixed and form-filling way at a circumferential distance from the slot for diameter reduction.

17. A tensioning device according to claim 16 wherein the damping bush comprises a resilient material.

18. A tensioning device according to claim 16 wherein at its first end, the flat band spring is held in a mount slot provided at the receiving and mounting housing.

19. A tensioning device according to claim 16 wherein at its second end, the flat band spring is held in a fixing slot provided in the damping bush.

20. A tensioning device according to claim 16 wherein the bearing comprises a bearing bush connected to the roller carrier and a bearing pin connected to the receiving and mounting housing.

21. A tensioning device according to claim 16 wherein the first spring provided between the roller carrier and the receiving and mounting housing is a flat spiral spring.

22. A tensioning device according to claim 16 wherein the first spring provided between the roller carrier and the receiving and mounting housing is a helical spring.

23. A tensioning device according to claim 22 wherein the helical spring, when subjected to tensile loads, also connects the roller carrier to the receiving and mounting housing and axially fixes the roller carrier, via the bearing, relative to the receiving and mounting housing.

* * * * *

UNITED STATES PATENT AND TRADEMARK OFFICE
CERTIFICATE OF CORRECTION

PATENT NO. : 7,104,909 B2 Page 1 of 1
APPLICATION NO. : 10/950847
DATED : September 12, 2006
INVENTOR(S) : Jochen Asbeck et al.

It is certified that error appears in the above-identified patent and that said Letters Patent is hereby corrected as shown below:

Column 6, Line 39, should read as follows: -- ways. The flat band spring 10, by way of its first end 11, is --

Claim 1:
Column 7, Line 55, should read as follows: -- ing housing in such a way that the damping effect is --

Claim 14:
Column 8, Line 40, should read as follows: -- first spring provided between the roller carrier and the --

Claim 16:
Column 8, Line 62, should read as follows: -- greater in the direction of an increasing tensioning --

Claim 16:
Column 9, Line 4, should read as follows: -- fitting way at a circumferential distance from the slot --

Signed and Sealed this

Twelfth Day of December, 2006

JON W. DUDAS
*Director of the United States Patent and Trademark Office*